US009310483B2

(12) United States Patent
Misonoo et al.

(10) Patent No.: US 9,310,483 B2
(45) Date of Patent: Apr. 12, 2016

(54) DEVICE AND METHOD FOR TRANSCEIVING ULTRASONIC WAVE

(71) Applicant: FURUNO ELECTRIC CO., LTD., Nishinomiya, Hyogo-Pref. (JP)

(72) Inventors: Satoshi Misonoo, Nishinomiya (JP); Nicolas Borrallo, Nishinomiya (JP); Yuji Onishi, Nishinomiya (JP); Shogo Nagai, Nishinomiya (JP); Suenobu Hase, Nishinomiya (JP); Takeharu Yamaguchi, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 435 days.

(21) Appl. No.: 13/871,101

(22) Filed: Apr. 26, 2013

(65) Prior Publication Data
US 2013/0286784 A1    Oct. 31, 2013

(30) Foreign Application Priority Data

Apr. 27, 2012   (JP) .................................. 2012-102635

(51) Int. Cl.
*G01S 15/12*   (2006.01)
*G01S 15/10*   (2006.01)
(Continued)

(52) U.S. Cl.
CPC ................ *G01S 15/12* (2013.01); *G01S 7/539* (2013.01); *G01S 15/102* (2013.01); *G01S 15/89* (2013.01); *G01S 15/96* (2013.01); *G01V 2210/1212* (2013.01)

(58) Field of Classification Search
CPC ..................... G01V 2210/1212; G01S 15/102; G01S 15/12; G01S 15/96
See application file for complete search history.

(56) References Cited

U.S. PATENT DOCUMENTS 3,268,800 A * 8/1966 Hoehn, Jr. ................ G01V 3/32
324/303
3,312,934 A * 4/1967 Stripling .................. G01V 1/44
367/27
(Continued)

FOREIGN PATENT DOCUMENTS

JP      11-52048 A    2/1999
JP   2008-190875 A   8/2008
(Continued)

OTHER PUBLICATIONS

Office Action of the corresponding Japanese Patent Application No. 2012-102635, dated Jan. 26, 2016.

*Primary Examiner* — Ari M Diacou
(74) *Attorney, Agent, or Firm* — Global IP Counselors, LLP

(57) ABSTRACT

An ultrasonic wave transceiving device is provided. The device includes a transmitter for transmitting at least one kind of first detection data ultrasonic signal and a plurality of kinds of second detection data ultrasonic signals, a receiver for receiving echo signals of the first and second detection data ultrasonic signals, and first and second information generators for generating first and second information based on the echo signal of the first and second detection data ultrasonic signals, respectively. The transmitter transmits the first and second detection data ultrasonic signals which transmission period of the first detection data ultrasonic signal intervenes between transmission periods of the second detection data ultrasonic signals in time axis. The second information generator generates the second information by using the echo signals of the second detection data ultrasonic signals.

10 Claims, 10 Drawing Sheets

(51) Int. Cl.
*G01S 15/96* (2006.01)
*G01S 15/89* (2006.01)
*G01S 7/539* (2006.01)

(56) References Cited

U.S. PATENT DOCUMENTS

| | | | | |
|---|---|---|---|---|
| 3,787,845 | A | * | 1/1974 | Kubota ............... G01S 13/9307 342/41 |
| 3,885,225 | A | * | 5/1975 | Anstey .................. G01V 1/006 367/41 |
| 4,147,228 | A | * | 4/1979 | Bouyoucos ............ G01V 1/147 181/114 |
| 4,209,843 | A | * | 6/1980 | Hyatt ................. B60R 16/0373 708/422 |
| 4,369,508 | A | * | 1/1983 | Weber ..................... G01S 15/96 367/115 |
| 4,491,930 | A | * | 1/1985 | Hyatt ................. B60R 16/0373 708/3 |
| 4,606,015 | A | * | 8/1986 | Yamaguchi ........... G01S 15/102 367/107 |
| 4,758,997 | A | * | 7/1988 | Nelson ..................... G01V 1/04 181/120 |
| 5,453,932 | A | * | 9/1995 | Brabec .................... G01S 7/527 342/137 |
| 5,459,479 | A | * | 10/1995 | Cummings ............... G01S 7/64 345/33 |
| 6,704,245 | B2 | * | 3/2004 | Becquey ................ G01V 1/005 367/39 |
| 2008/0232194 | A1 | * | 9/2008 | Jeffryes ................ G01V 1/005 367/38 |
| 2009/0122642 | A1 | | 5/2009 | Komatsu et al. |
| 2009/0201766 | A1 | * | 8/2009 | Nishida ................... G01S 7/524 367/134 |
| 2010/0283628 | A1 | * | 11/2010 | Kubota ................... G01S 7/539 340/850 |
| 2010/0309753 | A1 | * | 12/2010 | Misonoo ............... G01S 7/6218 367/107 |
| 2011/0032801 | A1 | * | 2/2011 | Onishi ................... G01S 7/527 367/152 |
| 2011/0273963 | A1 | * | 11/2011 | Onishi ................. G01S 7/2927 367/93 |
| 2012/0195167 | A1 | | 8/2012 | Kubota et al. |
| 2013/0250723 | A1 | * | 9/2013 | Dean ..................... G01V 1/005 367/43 |
| 2015/0234046 | A1 | * | 8/2015 | Yamaguchi ............ G01S 15/96 367/93 |

FOREIGN PATENT DOCUMENTS

| | | |
|---|---|---|
| JP | 2008-275351 A | 11/2008 |
| JP | 2010-266280 A | 11/2010 |
| JP | 2012251952 A * | 12/2012 |

* cited by examiner

DEVICE AND METHOD FOR TRANSCEIVING ULTRASONIC WAVE

CROSS-REFERENCE TO RELATED APPLICATION(S)

The application claims priority under 35 U.S.C. §119 to Japanese Patent Application No. 2012-102635, which was filed on Apr. 27, 2012, the entire disclosure of which is hereby incorporated by reference.

TECHNICAL FIELD

The present invention generally relates to an ultrasonic wave transceiving device for transmitting an ultrasonic signal underwater, generating display data displaying echoes of a school-of-fish or a water bottom, and generating additional information of the school-of-fish or the water bottom.

BACKGROUND OF THE INVENTION

Conventionally, various ultrasonic wave transceiving devices for displaying a sea bottom as well as a school-of-fish at the same time, and also additional information of the school-of-fish or the water bottom have been devised. For example, JP1999-052048A discloses an underwater detecting device that transmits one kind of ultrasonic signals, and displays a detection image as well as discriminating a water bottom sediment type by using echo signals obtained from the transmitted ultrasonic signals.

However, ultrasonic signals have different reflection characteristics between a school-of-fish and a water bottom sediment. Therefore, in a case where the configuration and the method of JP1999-052048A are used and the ultrasonic signal is adjusted to accurately discriminate, for example, the school-of-fish, then the water bottom sediment type cannot be discriminated accurately. Conversely, in a case where the ultrasonic signal is adjusted to accurately discriminate the water bottom sediment type, then the school-of-fish cannot be discriminated accurately.

Therefore, other various ultrasonic wave transceiving devices for transmitting different ultrasonic signals for school-of-fish detection (for an echo image) and water bottom sediment type discrimination (for additional information) have been devised. Further, there also exist ultrasonic wave transceiving devices for transmitting ultrasonic signals for school-of-fish detection at two different frequencies and transmitting ultrasonic signals for water bottom sediment type discrimination at two different frequencies in order to improve the function for the school-of-fish detection as well as the function for the water bottom sediment type discrimination.

FIG. 10 is a view showing a conventional transception concept. The conventional ultrasonic wave transceiving device transmits first ultrasonic signal FM(H)Tx and second ultrasonic signal FM(L)Tx for school-of-fish detection sequentially in series. The first and second ultrasonic signals FM(H)Tx and FM(L)Tx have the same pulse length therebetween. The frequency of the signal forming the pulse of the first ultrasonic signal FM(H)Tx is higher than that of the second ultrasonic signal FM(L)Tx. The conventional ultrasonic wave transceiving device generates high frequency echo data and low frequency echo data based on echo signals of the sequential first and second ultrasonic signals FM(H)Tx and FM(L)Tx to obtain an echo image.

The conventional ultrasonic wave transceiving device transmits third ultrasonic signal CW(H)Tx and fourth ultrasonic signal CW(L)Tx sequentially in series. The third and fourth ultrasonic signals CW(H)Tx and CW(L)Tx have the same pulse length therebetween. The frequency of the signal forming the pulse of the third ultrasonic signal CW(H)Tx is higher than that of the fourth ultrasonic signal CW(L)Tx. The conventional ultrasonic wave transceiving device generates additional information based on echo signals of the sequential third and fourth ultrasonic signals CW(H)Tx and CW(L)Tx.

The conventional ultrasonic wave transceiving device repeats the transmissions of the first ultrasonic signal FM(H)Tx, the second ultrasonic signal FM(L)Tx, the third ultrasonic signal CW(H)Tx, and fourth ultrasonic signal CW(L)Tx as one group.

However, in the method of using the dual-frequency ultrasonic signals for the echo image generation and the additional information generation, respectively, a period of the transmissions of the two kinds of ultrasonic signals for the additional information generation and the receptions of the echo signals thereof intervenes between a period of the transmissions of the ultrasonic signals for a current echo image generation and the receptions of the echo signals thereof and a period of the transmissions of the ultrasonic signals for the next echo image generation and the receptions of the echo signals thereof. In this case, an interval between the transception periods for the echo image generation becomes longer by a transception period $Ti_p$ for the additional information. Therefore, a transception cycle $TE_p$ for the echo image becomes longer, causing a delay in transmission cycle of the echo image.

Additionally, the period of the transmissions of the two kinds of ultrasonic signals for the echo image generation and the receptions of the echo signals thereof intervenes between a period of the transmissions of the ultrasonic signals for a current additional information generation and the receptions of the additional information thereof and a period of the transmissions of the ultrasonic signals for the next additional information generation and the receptions of the additional information thereof. In this case, an interval between the transception periods for the additional information generation becomes longer by the transception period for the echo image. Therefore, the generation interval of the additional information becomes longer, causing possible degradation in reliability.

SUMMARY OF THE INVENTION

The present invention is made in view of the above situation, and it provides an ultrasonic wave transceiving device that can increase an update speed of an echo image compared to the conventional speed mostly without degrading reliability of additional information, and can shorten a generation interval of the additional information and improve the reliability of the additional information without causing deterioration in the update speed of the echo image.

According to an aspect of the invention, an ultrasonic wave transceiving device is provided. The device includes a transmitter, a receiver, a first information generator, and a second information generator. The transmitter transmits at least one kind of first detection data ultrasonic signal and a plurality of kinds of second detection data ultrasonic signals. The receiver receives echo signals of the first and second detection data ultrasonic signals. The first information generator generates first information based on the echo signal of the first detection data ultrasonic signal. The second information generator generates second information relating to the first information, based on the echo signals of the second detection data ultrasonic signals. The transmitter transmits the first and second detection data ultrasonic signals such that a transmission period of the first detection data ultrasonic signal intervenes between transmission periods of the second detection data ultrasonic signals in a time axis, one kind of second detection data ultrasonic signal being transmitted in each transmission period of the second detection data ultrasonic signal. The second information generator generates the second information by using the echo signals of the second detection data ultrasonic signals.

In this configuration, even if the number of kinds of the second detection data ultrasonic signals to be inserted between first detection data ultrasonic signals adjacent to each other in the time axis is reduced, by transmitting each kind of the second detection data ultrasonic signals in order, the second information can be generated from the plurality of second detection data ultrasonic signals sandwiching the first detection data ultrasonic signals. In this manner, an acquiring cycle for the first information can be prevented from becoming longer and can be shortened, and reliability of the second information can be suppressed from degrading and can be improved.

The first information may be generated as an echo image, and the second information may be generated as information indicating a property of a target object appearing in the echo image.

In this configuration, the specific examples of the first information and the second information are shown. Further, by setting the echo image as the first information, an update cycle of the echo image can be prevented from becoming longer, and/or the update cycle can be shorter. Moreover, reliability of the information showing the property of the target object can be suppressed from degrading and can be improved.

The transmitter may transmit underwater each ultrasonic signal. The first information may be an echo image including images of a school-of-fish, a single fish, and a water bottom underwater. The second information may be information indicating a sediment type of the water bottom.

In this configuration, the specific example of applying the ultrasonic wave transceiving device to an underwater detecting device such as a fish finder having a sea bottom sediment discriminating function is shown.

The first detection data ultrasonic signal may include a plurality of ultrasonic signals that are transmitted individually. The second information generator may generate third information by using echo signals of the plurality of ultrasonic signals forming the first detection data ultrasonic signal, the ultrasonic signals being adjacent to each other in the time axis.

In this configuration, the third information can be acquired from the echo signals of the plurality of ultrasonic wave signals configuring the first detection data ultrasonic signals for acquiring the first information. Here, because the adjacent ultrasonic wave signals are used, the third information can be acquired more frequently compared to the first information regardless of sandwiching the second detection data ultrasonic signals therebetween.

According to another aspect of the invention, an ultrasonic wave transceiving device is provided. The device includes a transmitter, a receiver, a first information generator, and a third information generator. The transmitter transmits a plurality of first detection data ultrasonic signals as one group. The receiver receives echo signals of the first detection data ultrasonic signals. The first information generator generates first information based on each of the echo signals of the group of the first detection data ultrasonic signals. The third information generator generates third information by using echo signals of the first detection data ultrasonic signals that are adjacent to each other in a time axis.

Also in this configuration, the third information can be acquired from the echo signals of the plurality of ultrasonic wave signals configuring the first detection data ultrasonic signals for acquiring the first information. Here, because the adjacent ultrasonic wave signals are used regardless of the group, the third information can be acquired more frequently compared to the first information.

The third information may be information indicating a fish body length of a single fish. In this configuration, the specific example of the third information is shown.

The first detection data ultrasonic signal may include first and second ultrasonic signals having a first pulse length. The second detection data ultrasonic signals may include third and fourth ultrasonic signals having a second pulse length. The first information may be generated based on the echo signals of the first and second ultrasonic signals. The second information may be generated based on the echo signals of the third and fourth ultrasonic signals.

In this configuration, the specific examples of forming the first and second detection data ultrasonic signals are shown.

The first pulse length may be different from the second pulse length. In this configuration, the specific length relation between the first and second pulse lengths is shown. Thus, since the first and second pulse lengths are different from each other, suitable pulse lengths for the first and second information can be set respectively.

According to another aspect of the invention, a method of transceiving ultrasonic waves is provided. The method includes transmitting at least one kind of first detection data ultrasonic signal and a plurality of kinds of second detection data ultrasonic signals, receiving echo signals of the first and second detection data ultrasonic signals, generating first information based on the echo signal of the first detection data ultrasonic signal, and generating second information relating to the first information, based on the echo signals of the second detection data ultrasonic signals. The first and second detection data ultrasonic signals are transmitted such that a transmission period of the first detection data ultrasonic signal intervenes between transmission periods of the second detection data ultrasonic signals in a time axis, one kind of second detection data ultrasonic signal being transmitted in each transmission period of the second detection data ultrasonic signal. The second information is generated by using the echo signals of the second detection data ultrasonic signals.

In this configuration, even if the number of kinds of the second detection data ultrasonic signals to be inserted between first detection data ultrasonic signals adjacent to each other in the time axis is reduced, by transmitting each kind of the second detection data ultrasonic signals in order, the second information can be generated from the plurality of second detection data ultrasonic signals sandwiching the first detection data ultrasonic signals. In this manner, an acquiring cycle for the first information can be prevented from becoming longer and can be shortened, and reliability of the second information can be suppressed from degrading and can be improved.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

First Embodiment

A device and method for transceiving ultrasonic waves according to a first embodiment of the invention are described with reference to the appended drawings. Note that, although a fish finder having a water bottom sediment type discriminating function is described to be applied with the configuration of the invention, it is merely an example, and the configuration of the invention is applicable as long as it is a device for transmitting a plurality kinds of ultrasonic waves, and performing detecting processing or generating processing of an echo image based on echo signals of the ultrasonic waves.

Figure 1:
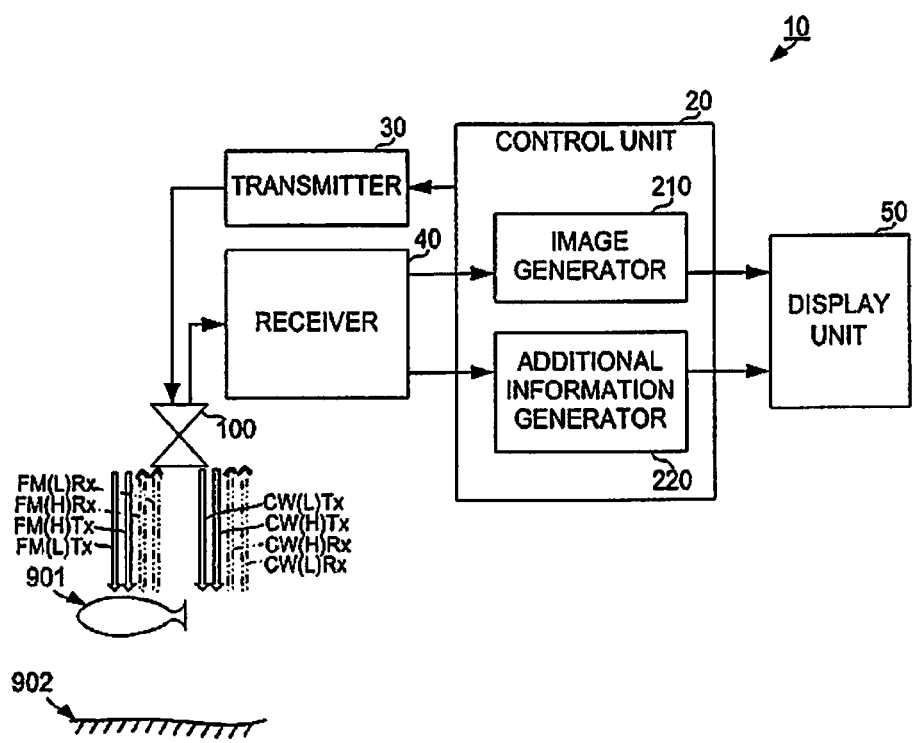
FIG. 1 is a block diagram of an ultrasonic wave transceiving device 10 according to a first embodiment of the invention.

FIG. 1 is a diagram of an ultrasonic wave transceiving device 10 according to the first embodiment. The ultrasonic wave transceiving device 10 includes a control unit 20, a transmitter 30, a receiver 40, a display unit 50, and a transducer 100.

The control unit 20 performs an overall control of the ultrasonic wave transceiving device 10. The control unit 20 performs a control to transmit four kinds of ultrasonic signals (a first ultrasonic signal FM(H)Tx, a second ultrasonic signal FM(L)Tx, a third ultrasonic signal CW(H)Tx, and a fourth ultrasonic signal CW(L)Tx) in a predetermined order as one function of a transmission system. The transmission control signal is given to the transmitter 30. Note that, specific contents of the transmission control are described later. The first and second ultrasonic signals FM(H)Tx and FM(L)Tx correspond to the "first detection data ultrasonic signal" in the claims, and the third and fourth ultrasonic signals CW(H)Tx and CW(L)Tx correspond to the "second detection data ultrasonic signal" in the claims.

The transmitter 30 generates the first ultrasonic signal FM(H)Tx, the second ultrasonic signal FM(L)Tx, the third ultrasonic signal CW(H)Tx, and the fourth ultrasonic signal CW(L)Tx based on the transmission control signal. The first and second ultrasonic signals FM(H)Tx and FM(L)Tx have the same pulse length therebetween, the pulse length being the first pulse length. The first and the second ultrasonic signals FM(H)Tx and FM(L)Tx are ultrasonic signals of which frequencies are modulated for pulse compression. The third and fourth ultrasonic signals CW(H)Tx and CW(L)Tx have the same pulse length therebetween, the pulse length being the second pulse length. The third and fourth ultrasonic signals CW(H)Tx and CW(L)Tx are frequency-unmodulated ultrasonic signals. The second pulse length is different from the first pulse length. Hereinafter, one example in which the first pulse length is shorter than the second pulse length is described. Note that, the first and second pulse lengths are suitably set, respectively, by a detection range, etc.

Moreover, each of the first and third ultrasonic signals FM(H)Tx and CW(H)Tx is obtained by pulse-forming a carrier wave at a first frequency. Each of the second and fourth ultrasonic signals FM(L)Tx and CW(L)Tx is obtained by pulse-forming a carrier wave at a second frequency. The first frequency is higher than the second frequency. Note that, the first and second frequencies are suitably set within an ultrasonic wave frequency band. For example, the first frequency is set to 200 kHz, and the second frequency is set to 50 kHz.

Each ultrasonic signal is propagated to the transducer 100. The transducer 100 is attached to a bottom of a ship, etc. The transducer 100 transmits the ultrasonic signal to have a predetermined directivity angle with respect to a vertically downward direction of the ship.

The ultrasonic signal reflects on fish (or school of fish) 901 underwater or a water bottom 902 to be received as the echo signal by the transducer 100. The echo signal of the first ultrasonic signal FM(H)Tx is a first echo signal FM(H)Rx, the echo signal of the second ultrasonic signal FM(L)Tx is a second echo signal FM(L)Rx, the echo signal of the third ultrasonic signal CW(H)Tx is a third echo signal CW(H)Rx, and the echo signal of the fourth ultrasonic signal CW(L)Tx is a fourth echo signal CW(L)Rx.

The transducer 100 outputs the echo signal to the receiver 40. The receiver 40 performs predetermined amplifying processing on each echo signal as well as samples each echo signal at a time interval corresponding to a distance resolution to generate echo data where data are discretely aligned in a distance direction (water depth direction). Each echo data is outputted to a reception system circuit of the control unit 20. Note that, to make the description simple and easy to understand, the echo data obtained by discretely sampling the echo signals are denoted with the same reference numeral as the echo signals.

The reception system circuit of the control unit 20 includes an image generator 210 corresponding to the "first information generator" in the claims, and an additional information generator 220 corresponding to the "second information generator" in the claims.

The image generator 210 generates a high frequency echo image with the first echo data FM(H)Rx which is inputted sequentially. Further, the image generator 210 generates a low frequency echo image with the second echo data FM(L)Rx. In the high frequency echo image and the low frequency echo image, the vertical axis indicates the water depth (distance direction), and the horizontal axis indicates a time axis (PING). Each of the high and low frequency echo images is formed as an image where echo data of each PING is sequentially transmitted in the horizontal direction such that when latest echo data is inputted, the latest echo data appears at one end in the horizontal axis in the image and the oldest data at the other end in the horizontal axis in the image disappears. These echo images correspond to the "first information" in the claims.

Here, the image generator 210 applies a known pulse compression to the first and second echo data FM(H)Rx and FM(L)Rx. In this manner, a pulse lengths of each of the first and second echo data FM(H)Rx and FM(L)Rx becomes shorter than a pulse length of each of the third and fourth echo data CW(H)Rx and CW(L)Rx, the resolution in the distance direction improves, and an echo image with excellent distance resolution can be formed.

The image generator 210 outputs the high and low frequency echo images to the display unit 50. Note that, the high and low frequency echo images may selectively or both be outputted based on, for example, an input by an operator.

The additional information generator 220 discriminates a sediment type of the water bottom 902 based on a group of the third and fourth echo data CW(H)Rx and CW(L)Rx adjacent to each other in the time axis. The additional information generator 220 discriminates the sediment type by using that a frequency characteristic of the water bottom reflection echo is different depending on the water bottom sediment type (e.g., rocks, gravel, sand or mud). The water bottom sediment type discrimination result corresponds to the "second information" in the claims. By using the echo data CW(H)Rx and CW(L)Rx of the third and fourth ultrasonic signals CW(H)Tx and CW(L)Tx of which the pulse lengths are relatively long as described above, the water bottom sediment type can be discriminated more accurately.

The additional information generator 220 outputs the water bottom sediment type discrimination result to the display unit 50.

The display unit 50 displays the echo image and the water bottom sediment type discrimination result in a predetermined display pattern.

Figure 2:
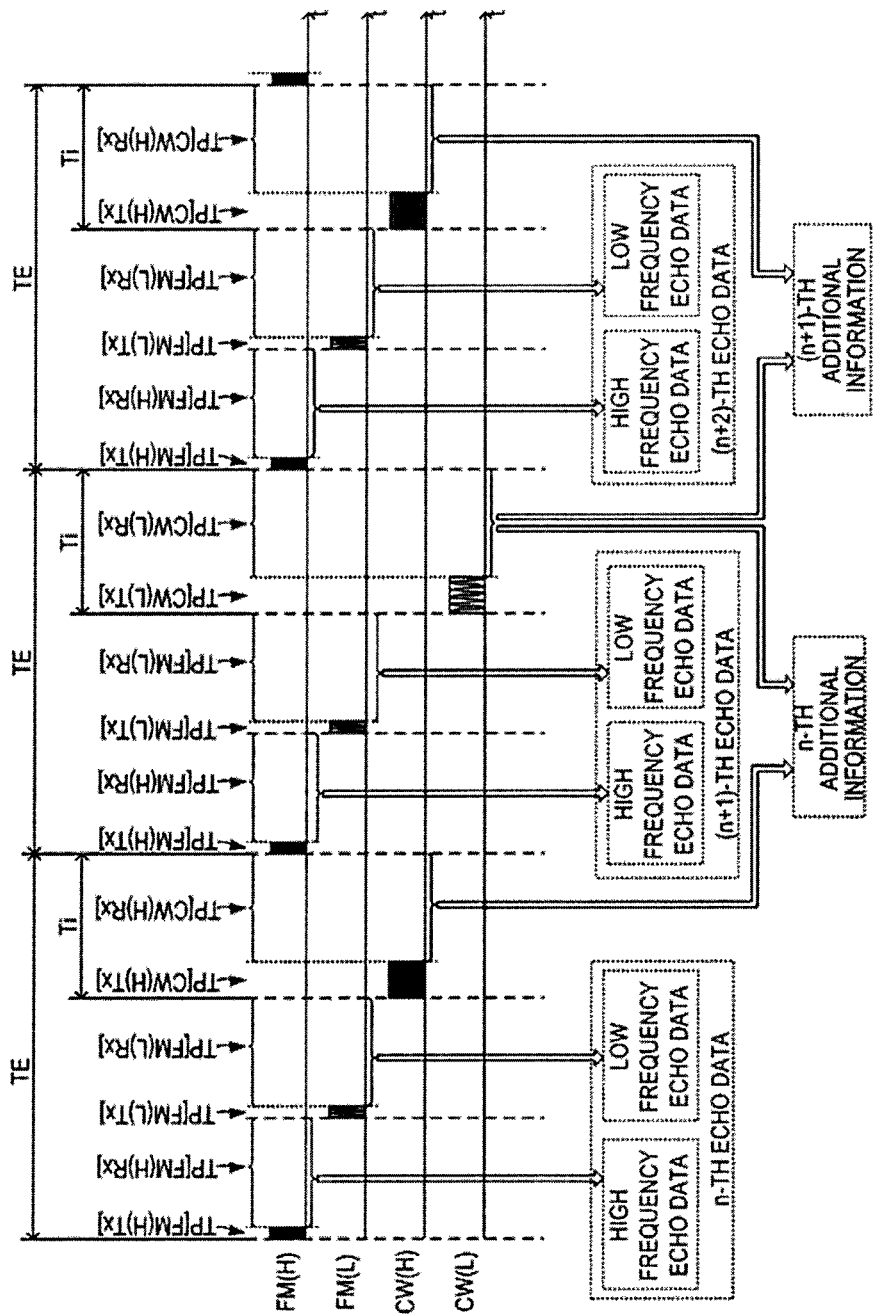
FIG. 2 is a view showing a transception concept of the ultrasonic wave transceiving device 10 according to the first embodiment.

In the ultrasonic wave transceiving device 10 having such a configuration, the following transception control is performed. FIG. 2 is a view showing a transception concept of the ultrasonic wave transceiving device 10 according to the first embodiment. The transception control of an n-th period to an (n+2)th period is illustrated in FIG. 2, and practically, the echo image generation and the water bottom sediment type discrimination are performed while repeating such transceptions.

The n-th transception group includes the first, second, and third ultrasonic signals FM(H)Tx, FM(L)Tx, and CW(H)Tx, and the n-th transception is performed with this group.

Specifically, at a start timing of an n-th transception period, the first ultrasonic signal FM(H)Tx is transmitted. After the transmission of the first ultrasonic signal FM(H)Tx ends, a reception period TP(FM(H)Rx) of the first echo signal FM(H)Rx is set. Based on the first echo data FM(H)Rx obtained in the reception period TP(FM(H)Rx), update data for the high frequency echo image of the n-th PING is generated.

Next, when the reception period TP(FM(H)Rx) of the first echo signal FM(H)Rx ends, the second ultrasonic signal FM(L)Tx is transmitted. After the transmission of the second ultrasonic signal FM(L)Tx, a reception period TP(FM(L)Rx) of the second echo signal FM(L)Rx is set. Based on the second echo data FM(L)Rx obtained in the reception period TP(FM(L)Rx), update data for the low frequency echo image of the n-th PING is generated.

Each of these reception periods TP(FM(H)Rx) and TP(FM(L)Rx) are set by a detection range.

Next, when the reception period TP(FM(L)Rx) of the second echo signal FM(L)Rx ends, the third ultrasonic signal CW(H)Tx is transmitted. After the transmission of the third ultrasonic signal CW(H)Tx, a reception period TP(CW(H)Rx) of the third echo signal CW(H)Rx is set. The third echo data CW(H)Rx is stored in the additional information generator 220.

Next, when the reception period TP(CW(H)Rx) of the third echo signal CW(H)Rx ends, an (n+1)th transception is performed with a group including the first, second, and fourth ultrasonic signals FM(H)Tx, FM(L)Tx, and CW(L)Tx.

Specifically, when the reception period TP(CW(H)Rx) of the third echo signal CW(H)Rx ends, the (n+1)th first ultrasonic signal FM(H)Tx is transmitted. After the transmission of the first ultrasonic signal FM(H)Tx, a reception period TP(FM(H)Rx) of the first echo signal FM(H)Rx is set. Based on the first echo data FM(H)Rx obtained in the reception period TP(FM(H)Rx), update data for the high frequency echo image of the (n+1)th PING is generated.

Next, when the reception period TP(FM(H)Rx) of the first echo signal FM(H)Rx ends, the second ultrasonic signal FM(L)Tx is transmitted. After the transmission of the second ultrasonic signal FM(L)Tx, the reception period TP(FM(L)Rx) of the second echo signal FM(L)Rx is set. Based on the second echo data FM(L)Rx obtained in the reception period TP(FM(L)Rx), update data for the low frequency echo image of the (n+1)th PING is generated.

Next, when the (n+1)th reception period TP(FM(L)Rx) of the second echo signal FM(L)Rx ends, the fourth ultrasonic signal CW(L)Tx is transmitted. After the transmission of the fourth ultrasonic signal CW(L)Tx, a reception period TP(CW(L)Rx) of the fourth echo signal CW(L)Rx is set. The fourth echo data CW(L)Rx is stored in the additional information generator 220. The additional information generator 220 pairs up the third echo data CW(H)Rx obtained from the n-th transception group with the fourth echo data CW(L)Rx obtained from the (n+1)th transception group, and uses the pair as n-th water bottom sediment type discrimination data.

Next, when the reception period TP(CW(L)Rx) of the fourth echo signal FM(L)Rx ends, an (n+2)th transception is performed with a group including the first, second, and third ultrasonic signals FM(H)Tx, FM(L)Tx, and CW(H)Tx similar to the n-th transception.

Specifically, at a start timing of an (n+2)th transception period, the first ultrasonic signal FM(H)Tx is transmitted. After the transmission of the first ultrasonic signal FM(H)Tx, a reception period TP(FM(H)Rx) of the first echo signal FM(H)Rx is set. Based on the first echo data FM(H)Rx obtained in the reception period TP(FM(H)Rx), update data for the high frequency echo image of the (n+2)th PING is generated.

Next, when the reception period TP(FM(H)Rx) of the first echo signal FM(H)Rx ends, the second ultrasonic signal FM(L)Tx is transmitted. After the transmission of the second ultrasonic signal FM(L)Tx, a reception period TP(FM(L)Rx) of the second echo signal FM(L)Rx is set. Based on the second echo data FM(L)Rx obtained in the reception period TP(FM(L)Rx), update data for the low frequency echo image of the (n+2)th PING is generated.

Next, when the reception period TP(FM(L)Rx) of the second echo signal FM(L)Rx ends, the third ultrasonic signal CW(H)Tx is transmitted. After the transmission of the third ultrasonic signal CW(H)Tx, a reception period TP(CW(H)Rx) of the third echo signal CW(H)Rx is set. The third echo data CW(H)Rx is stored in the additional information generator 220. The additional information generator 220 pairs up the fourth echo data CW(L)Rx obtained from the (n+1)th transception group with the third echo data CW(H)Rx obtained from the (n+2)th transception group, and uses the pair as (n+1)th water bottom sediment type discrimination data.

Thereafter, the above transception processing is repeated, and the high frequency echo image, the low frequency echo image, and the water bottom sediment type discrimination data are acquired for every transception period.

By using the configuration and the processing of this embodiment as above, only one of the transception period of the third ultrasonic signal CW(H)Tx and the transception period of the fourth ultrasonic signal CW(L)Tx intervenes between the transception periods of the first and second ultrasonic signals FM(H)Tx and FM(L)Tx for the echo image generation (Ti<$Ti_p$ (=2Ti), "Ti" being the transception period of each ultrasonic signal for the water bottom sediment type discrimination in this embodiment). In this manner, an interval TE between the transception periods of the first and second ultrasonic signals FM(H)Tx and FM(L)Tx adjacent to each other in the time axis becomes shorter than the interval $TE_p$ of the conventional processing method. Therefore, the feed speed (update speed) of the echo image can be speeded up.

Moreover, when the configuration and the processing of this embodiment are used, the number of transmissions of the ultrasonic signals for the water bottom sediment type discrimination in one transception group becomes less. A pair of echo data for the water bottom sediment type discrimination can be obtained for each transception group by combining the echo data of the ultrasonic signal for the water bottom sediment type discrimination obtained from one transception group with the echo data of the ultrasonic signal for the water bottom sediment type discrimination obtained from the transception group of one before (immediate previous transception group) or one after (next transception group).

Here, each ultrasonic signal has a predetermined transmission beam width when it is transmitted from the transducer 100. In other words, each ultrasonic signal propagates underwater while spreading by a predetermined transmission beam angle. Such an ultrasonic signal which propagates while spreading reflects on fish or the water bottom and is received by the transducer 100.

Therefore, if the traveling speed of the ship is within a predetermined speed range, a water bottom area where the third ultrasonic signal CW(H)Tx hits will partially overlap with a water bottom area where the fourth ultrasonic signal CW(L)Tx hits, third and fourth ultrasonic signals CW(H)Tx and CW(L)Tx being adjacent to each other in the time axis. In other words, if the ship travels at a speed within the predetermined speed range according to the transmission beam angle, the water bottom area where the third ultrasonic signal CW(H)Tx hits will partially overlap with the water bottom area where the fourth ultrasonic signal CW(L)Tx hits, third and fourth ultrasonic signals CW(H)Tx and CW(L)Tx being adjacent to each other in the time axis.

Therefore, even if the third and fourth ultrasonic signals CW(H)Tx and CW(L)Tx are transmitted in different transception groups adjacent to each other in the time axis, respectively, the reflection echoes thereof can be obtained from the same water bottom position.

In this manner, the water bottom sediment type discrimination result obtained by combining the third and fourth echo data CW(H)Rx and CW(L)Rx with each other becomes sufficiently highly reliable. Therefore, even with a less number of transmissions of the ultrasonic signals for the water bottom sediment type discrimination compared to the conventional case, the similar water bottom sediment type discrimination result to the conventional result can be obtained.

Figure 3:
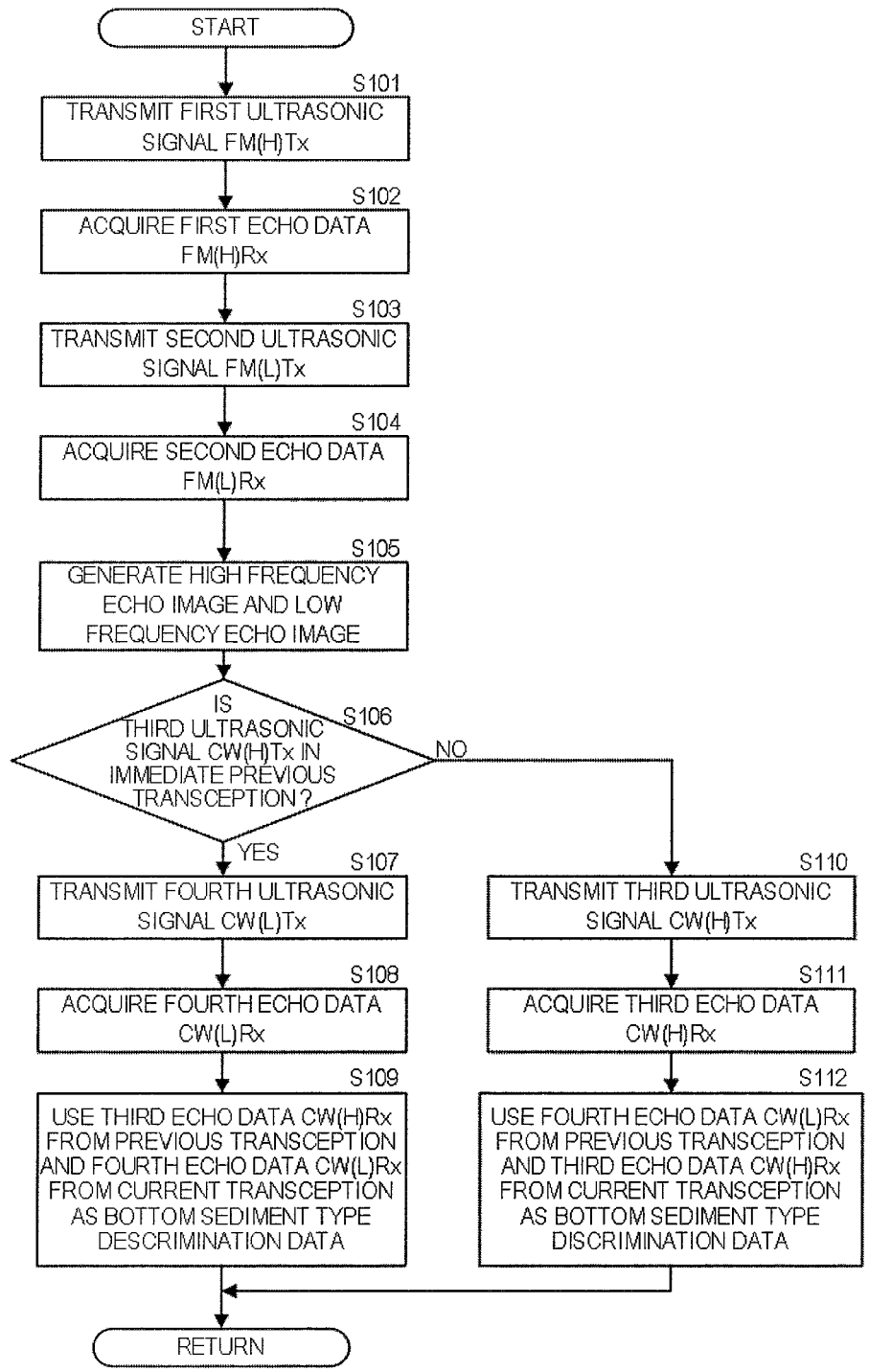
FIG. 3 is a flowchart showing one example of a processing flow for realizing a function of the first embodiment.

Note that, in the above description, the example in which the function components are divided to perform each control processing is performed, respectively; however, these control processing may be programmed and stored in, for example, a memory media in advance, so that they are performed by a computer. FIG. 3 is a flowchart showing one example of processing flow that realizes the function of the first embodiment.

First, the first ultrasonic signal FM(H)Tx is transmitted (Step S101), and the first echo data FM(H)Rx is acquired (Step S102). Next, the second ultrasonic signal FM(L)Tx is transmitted (Step S103), and the second echo data FM(L)Rx is acquired (Step S104).

The high frequency echo image for the current update is generated with the first echo data FM(H)Rx. The low frequency echo image for the current update is generated with the second echo data FM(L)Rx (Step S105). Note that, the transmission order of the first and second ultrasonic signals FM(H)Tx and FM(L)Tx may be opposite. Moreover, the high and low frequency echo images are not necessarily be updated simultaneously, as long as the high frequency echo image is updated when the first echo data FM(H)Rx is obtained, and the low frequency echo image is updated when the second echo data FM(L)Rx is obtained.

If the third ultrasonic signal CW(H)Tx is transmitted in the immediate previous transception group (Step S106: YES), in the current (latest) transception group, the fourth ultrasonic signal CW(L)Tx is transmitted (Step S107), and the fourth echo data CW(L)Rx is acquired (Step S108).

The third echo data CW(H)Rx obtained from the immediate previous transmission group is paired up with the fourth echo data CW(L)Rx obtained from the current transmission group to be used as current water bottom sediment type discrimination data (Step S109).

If the fourth ultrasonic signal CW(L)Tx is transmitted in the immediate previous transception group but third ultrasonic signal CW(H)Tx is not transmitted (Step S106: NO), in the current (latest) transmission group, the third ultrasonic signal CW(H)Tx is transmitted (Step S110), and the third echo data CW(H)Rx is acquired (Step S111).

The fourth echo data CW(L)Rx obtained from the immediate previous transmission group is paired up with the third echo data CW(H)Rx obtained from the current transmission group to be used as current water bottom sediment type discrimination data (Step S112).

By repeating this processing flow, the water bottom sediment type discrimination is performed while updating the echo image.

Second Embodiment

Figure 4:
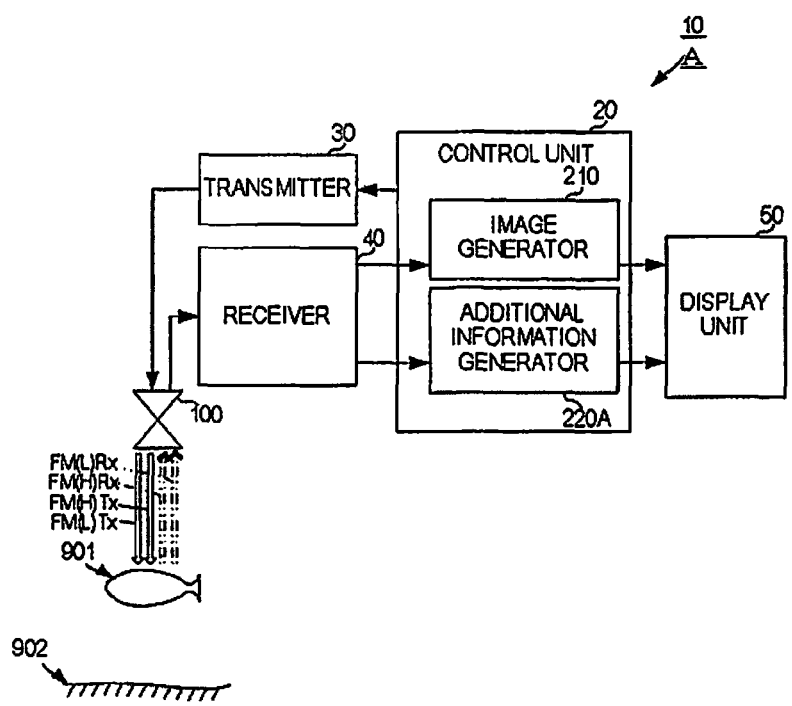
FIG. 4 is a block diagram showing an ultrasonic wave transceiving device 10A according to a second embodiment of the invention.
Figure 5:
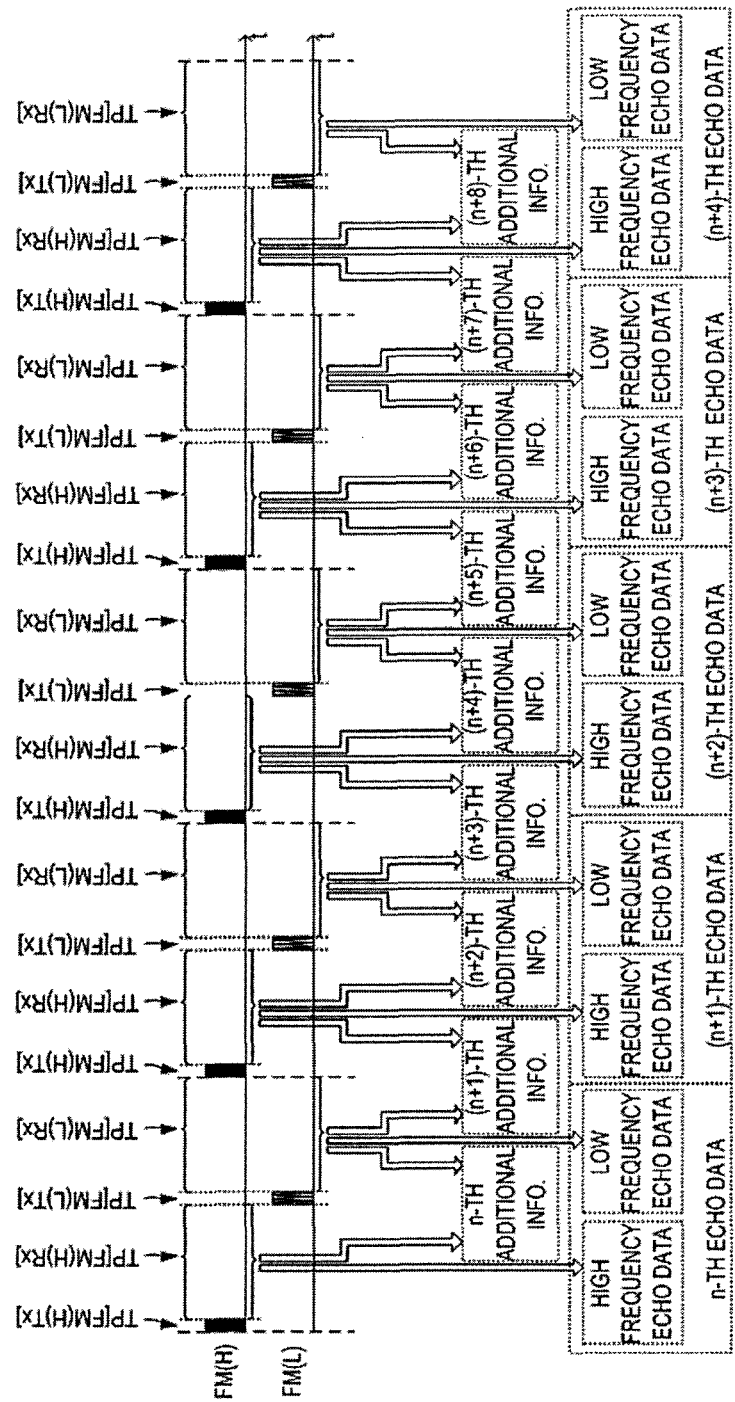
FIG. 5 is a view showing a transception concept of the ultrasonic wave transceiving device 10A according to the second embodiment.

Next, a device and method for transceiving ultrasonic waves according to a second embodiment of the invention are described with reference to the appended drawings. FIG. 4 is a diagram of an ultrasonic wave transceiving device 10A according to the second embodiment. FIG. 5 is a view showing a transception concept of the ultrasonic wave transceiving device 10A. The ultrasonic wave transceiving device 10A of this embodiment has the same configuration as the ultrasonic wave transceiving device 10 of the first embodiment, but only the first and second ultrasonic signals FM(H)Tx and FM(L)Tx are transmitted, and the third and fourth ultrasonic signals CW(H)Tx and CW(L)Tx are not transmitted.

At a start timing of an n-th transception period, the first ultrasonic signal FM(H)Tx is transmitted. After the transmission of the first ultrasonic signal FM(H)Tx, a reception period TP(FM(H)Rx) of the first echo signal FM(H)Rx is set and the first echo data FM(H)Rx is acquired. The image generator 210 generates the update data of the high frequency echo image of the n-th PING.

Next, when the reception period TP(FM(H)Rx) of the first echo signal FM(H)Rx ends, the second ultrasonic signal FM(L)Tx is transmitted. After the transmission of the second ultrasonic signal FM(L)Tx, a reception period TP(FM(L)Rx) of the second echo signal FM(L)Rx is set and the second echo data FM(L)Rx is acquired. The image generator 210 generates the update data of the low frequency echo image of the n-th PING.

Moreover, an additional information generator 220A provided to the ultrasonic wave transceiving device 10A uses the first and second echo data FM(H)Rx and FM(L)Rx in the n-th transception group for single-fish detection and fish body length measurement. Further, the additional information generator 220A acquires n-th fish body length information (fish body length information corresponds to the "third information" in the claims). Note that, the additional information generator 220A corresponds to the "third information generator" in the claims.

Next, when the n-th reception period TP(FM(L)Rx) of the second echo signal FM(L)Rx ends, the (n+1)th first ultrasonic signal FM(L)Tx is transmitted. After the transmission of the first ultrasonic signal FM(H)Tx, a reception period TP(FM(H)Rx) of the first echo signal FM(H)Rx is set and the first echo data FM(H)Rx is acquired. The image generator 210 generates the update data of the high frequency echo image of the (n+1)th PING.

Moreover, the additional information generator 220A uses the second echo data FM(L)Rx in the n-th (immediate previous) transception group and the first echo data FM(H)Rx in the (n+1)th (current) transception group for the single-fish detection and the fish body length measurement. Moreover, the additional information generator 220A generates the (n+1)th fish body length information.

Next, when the reception period TP(FM(H)Rx) of the first echo signal FM(H)Rx ends, the second ultrasonic signal FM(L)Tx is transmitted. After the transmission of the second ultrasonic signal FM(L)Tx, a reception period TP(FM(L)Rx) of the second echo signal FM(L)Rx is set and the second echo data FM(L)Rx is acquired. The image generator 210 generates the update data of the low frequency echo image of the (n+1)th PING.

Moreover, the additional information generator 220A uses the first and second echo data FM(H)Rx and FM(L)Rx in the (n+1)th transception group for the single-fish detection and the fish body length measurement. Further, the additional information generator 220A generates (n+2)th fish body length information.

Next, when the (n+1)th reception period TP(FM(L)Rx) of the second echo signal FM(L)Rx ends, the (n+2)th first ultrasonic signal FM(H)Tx is transmitted. After the transmission of the first ultrasonic signal FM(H)Tx, a reception period TP(FM(H)Rx) of the first echo signal FM(H)Rx is set and the first echo data FM(H)Rx is acquired. The image generator 210 generates the update data of the high frequency echo image of the (n+2)th PING.

Moreover, the additional information generator 220A uses the second echo data FM(L)Rx in the (n+1)th (immediate previous) transception group and the first echo data FM(H)Rx in the (n+2)th (current) transception group for the single-fish detection and the fish body length measurement. Moreover, the additional information generator 220A generates the (n+3)th fish body length information.

Next, when the reception period TP(FM(H)Rx) of the first echo signal FM(H)Rx ends, the second ultrasonic signal FM(L)Tx is transmitted. After the transmission of the second ultrasonic signal FM(L)Tx, a reception period TP(FM(L)Rx) of the second echo signal FM(L)Rx is set and the second echo data FM(L)Rx is acquired. The image generator 210 generates the update data of the low frequency echo image of the (n+2)th PING.

Moreover, the additional information generator 220A uses the first and second echo data FM(H)Rx and FM(L)Rx in the (n+2)th transception group for the single-fish detection and the fish body length measurement. Further, the additional information generator 220A acquires (n+4)th fish body length information.

Thereafter, similar processing is repeated. By using such a configuration and processing, the fish body length information can be updated at a cycle faster than the feed speed of the echo image. Note that, although only the fish body length information is described here, other information obtained by the echo data of the ultrasonic signal used in the echo image formation (e.g., school-of-fish speed) may be generated.

Figure 6:
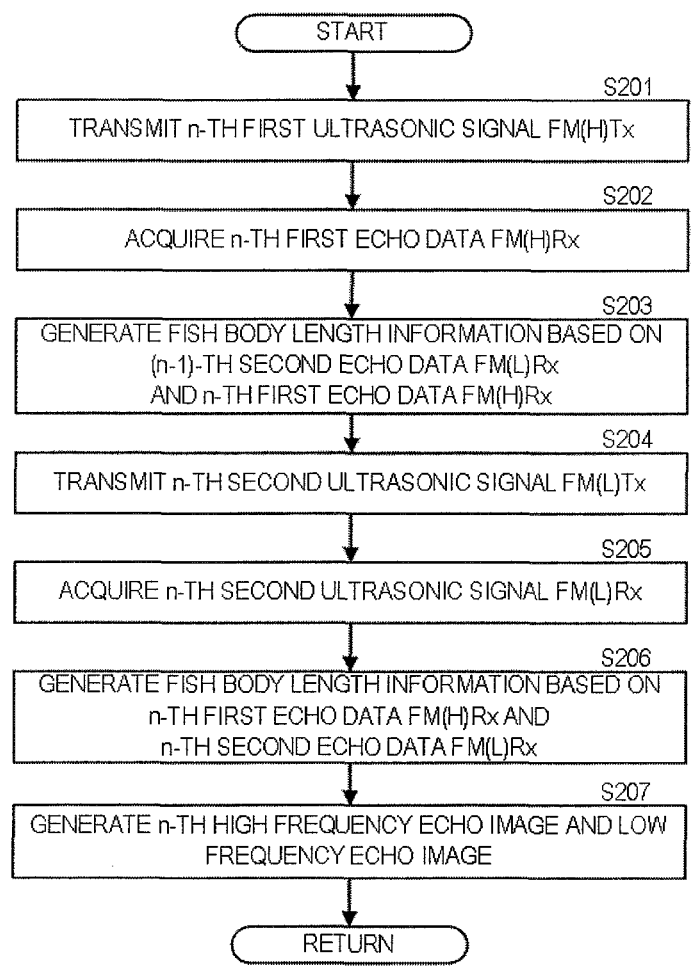
FIG. 6 is a flowchart showing one example of a processing flow for realizing a function of the second embodiment.

Note that, this processing may also be programmed and stored in, for example, a memory media in advance, so that they are performed by a computer. FIG. 6 is a flowchart showing one example of processing flow that realizes the function of the second embodiment. Note that, FIG. 6 shows the processing flow of the n-th transception, and the flow is continuously repeated.

The n-th first ultrasonic signal FM(H)Tx is transmitted (Step S201), and the n-th first echo data FM(H)Rx is acquired (Step S202). Next, the fish body length information is generated based on an (n−1)th second echo data FM(L)Rx stored in advance and the n-th first echo data FM(H)Rx acquired from the current transception (Step S203).

Next, the n-th second ultrasonic signal FM(L)Tx is transmitted (Step S204), and the n-th second echo data FM(L)Rx is acquired (Step S205). The fish body length information is generated based on the n-th first echo data FM(H)Rx and the n-th second echo data FM(L)Rx acquired from the current transception (Step S206).

The high frequency echo image for the current update is generated with the first echo data FM(H)Rx. The low frequency echo image for the current update is generated with the second echo data FM(L)Rx (Step S207).

Third Embodiment

Figure 7:
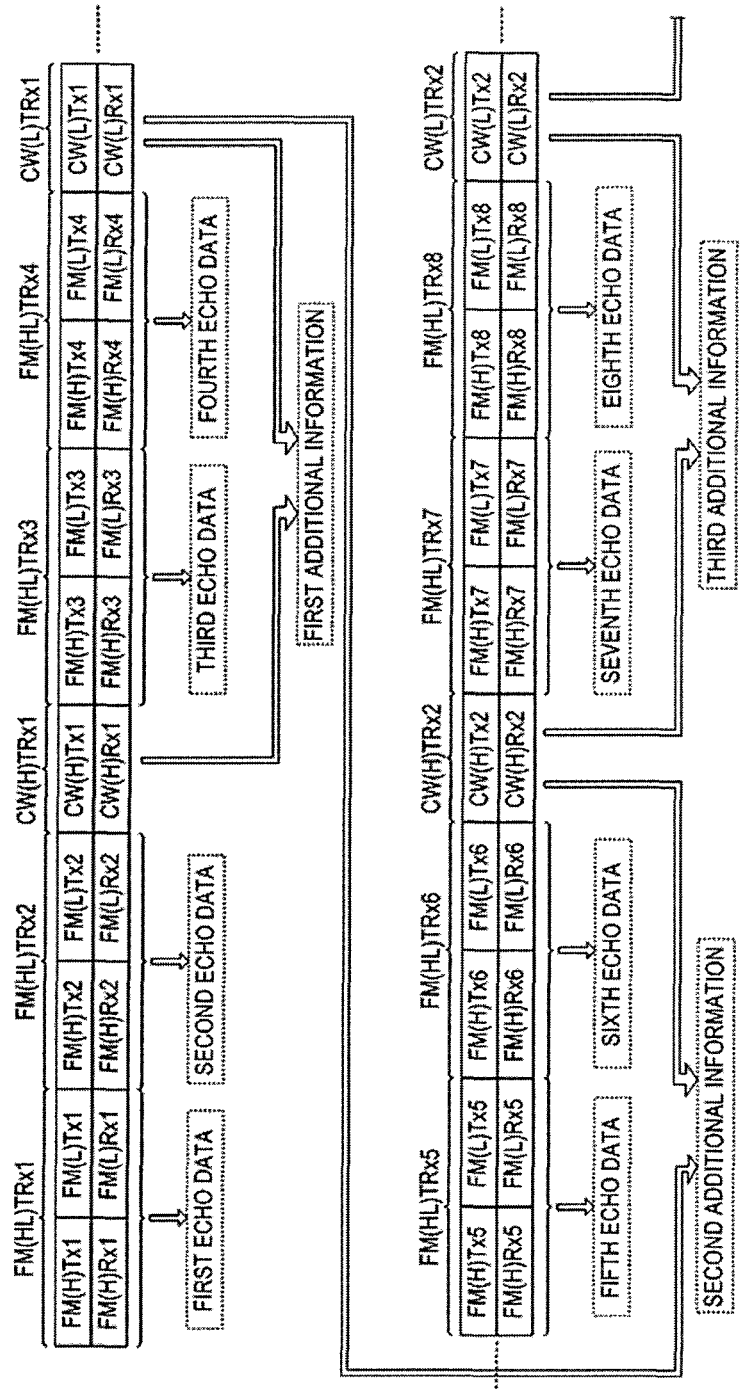
FIG. 7 is a view showing a transception concept of the ultrasonic wave transceiving device according to a third embodiment of the invention.

Next, a device and method for transceiving ultrasonic waves according to a third embodiment of the invention are described with reference to the appended drawings. FIG. 7 is a view showing a transception concept of an ultrasonic wave transceiving device according to the third embodiment. Note that, in FIG. 7, a certain timing during repeated transception is set to be the start of a first transception, and only a predetermined period from the first transception is illustrated. Moreover, hereinafter, the processing in the predetermined period from the first transception is described with reference to FIG. 7.

In the ultrasonic wave transceiving device of this embodiment, the transmission frequencies of the first and second ultrasonic signals FM(H)Tx and FM(L)Tx compared to the third and fourth ultrasonic signals CW(H)Tx and CW(L)Tx are increased than the ultrasonic wave transceiving device of the first embodiment. The basic configuration of the ultrasonic wave transceiving device of this embodiment is similar to the first embodiment shown in FIG. 1, but the processing is different therefrom. Specifically, the following processing is performed. Note that, hereinafter, the numeral added to each reference numeral of the ultrasonic signal (e.g., FM(H)Tx1, FM(L)Rx1) merely indicates the number of transmissions and receptions of each kind of the ultrasonic signals.

At a first transmission timing of a first ultrasonic signal FM(H)Tx1, a first transmission of the first ultrasonic signal FM(H)Tx1 is performed. After the transmission of the first ultrasonic signal FM(H)Tx1, first echo data FM(H)Rx1 is acquired. The image generator of this embodiment generates update data for a high frequency echo image of the first PING.

When the first reception of the first echo signal FM(H)Rx1 ends, a first transmission of the second ultrasonic signal FM(L)Tx1 is performed. After the transmission of the second ultrasonic signal FM(L)Tx1, second echo data FM(L)Rx1 is acquired. The image generator generates update data for a low frequency echo image of the first PING.

When the first reception of the second echo signal FM(H)Rx1 ends, a second transmission of the first ultrasonic signal FM(H)Tx2 is performed. After the transmission of the first ultrasonic signal FM(H)Tx2, first echo data FM(H)Rx2 is acquired. The image generator generates update data for a high frequency echo image of the second PING.

When the second reception of the first echo signal FM(H)Rx2 ends, a second transmission of the second ultrasonic signal FM(L)Tx2 is performed. After the transmission of the second ultrasonic signal FM(L)Tx2, second echo data FM(L)Rx2 is acquired. The image generator generates update data for a low frequency echo image of the second PING.

When the second reception of the second echo signal FM(L)Rx2 ends, a first transmission of the third ultrasonic signal CW(H)Tx1 is performed. After the transmission of the third ultrasonic signal CW(H)Tx1, third echo data CW(H)Rx1 is acquired. The third echo data CW(H)Rx1 is stored in the additional information generator of this embodiment. The additional information generator pairs up the third echo data CW(H)Rx1 obtained from the current transception group with fourth echo data CW(L)Rx obtained from the immediate previous transception group (not illustrated) to use them as water bottom sediment type discrimination data (not illustrated).

When the first reception of the third echo signal CW(H)Rx1 ends, a third transmission of the first ultrasonic signal FM(H)Tx3 is performed. After the transmission of the first ultrasonic signal FM(H)Tx3, first echo data FM(H)Rx3 is acquired. The image generator generates update data for a high frequency echo image of the third PING.

When the third reception of the first echo signal FM(H)Rx3 ends, a third transmission of the second ultrasonic signal FM(L)Tx3 is performed. After the transmission of the second ultrasonic signal FM(L)Tx3, second echo data FM(L)Rx3 is acquired. The image generator generates update data for a low frequency echo image of the third PING.

When the third reception of the second echo signal FM(L)Rx3 ends, a fourth transmission of the first ultrasonic signal FM(H)Tx4 is performed. After the transmission of the first ultrasonic signal FM(H)Tx4, first echo data FM(H)Rx4 is acquired. The image generator generates update data for a high frequency echo image of the fourth PING.

When the fourth reception of the first echo signal FM(H)Rx4 ends, a fourth transmission of the second ultrasonic signal FM(L)Tx4 is performed. After the transmission of the second ultrasonic signal FM(L)Tx4, second echo data FM(L)Rx4 is acquired. The image generator generates update data for a low frequency echo image of the fourth PING.

When the fourth reception of the second echo signal FM(L)Rx4 ends, a first transmission of the fourth ultrasonic signal CW(L)Tx1 is performed. After the transmission of the fourth ultrasonic signal CW(L)Tx1, fourth echo data CW(L)Rx1 is acquired. The fourth echo data CW(H)Rx1 is stored in the additional information generator. The additional information generator pairs up the fourth echo data CW(L)Rx1 obtained from the current transception group with third echo data CW(L)Rx1 obtained from the immediate previous transception group to use them as first water bottom sediment type discrimination data.

When the first reception of the fourth echo signal CW(L)Rx1 ends, a fifth transmission of the first ultrasonic signal FM(H)Tx5 is performed. After the transmission of the first ultrasonic signal FM(H)Tx5, first echo data FM(H)Rx5 is acquired. The image generator generates update data for a high frequency echo image of the fifth PING.

When the fifth reception of the first echo signal FM(H)Rx5 ends, a fifth transmission of the second ultrasonic signal FM(L)Tx5 is performed. After the transmission of the second ultrasonic signal FM(L)Tx5, second echo data FM(L)Rx5 is acquired. The image generator generates update data for a low frequency echo image of the fifth PING.

When the fifth reception of the second echo signal FM(L)Rx5 ends, a sixth transmission of the first ultrasonic signal FM(H)Tx6 is performed. After the transmission of the first ultrasonic signal FM(H)Tx6, first echo data FM(H)Rx6 is acquired. The image generator generates update data for a high frequency echo image of the sixth PING.

When the sixth reception of the first echo signal FM(H)Rx6 ends, a sixth transmission of the second ultrasonic signal FM(L)Tx6 is performed. After the transmission of the second ultrasonic signal FM(L)Tx6, second echo data FM(L)Rx6 is acquired. The image generator generates update data for a low frequency echo image of the sixth PING.

When the sixth reception of the second echo signal FM(L)Rx6 ends, a second transmission of the third ultrasonic signal CW(H)Tx2 is performed. After the transmission of the third ultrasonic signal CW(H)Tx2, third echo data CW(H)Rx2 is acquired. The third echo data CW(H)Rx2 is stored in the additional information generator of this embodiment. The additional information generator pairs up the third echo data CW(H)Rx2 obtained from the current transception group with fourth echo data CW(L)Rx1 obtained from the immediate previous transception group to use them as second water bottom sediment type discrimination data.

When the second reception of the third echo signal CW(H)Rx2 ends, a seventh transmission of the first ultrasonic signal FM(H)Tx7 is performed. After the transmission of the first ultrasonic signal FM(H)Tx7, first echo data FM(H)Rx7 is acquired. The image generator generates update data for a high frequency echo image of the seventh PING.

When the seventh reception of the first echo signal FM(H)Rx7 ends, a seventh transmission of the second ultrasonic signal FM(L)Tx7 is performed. After the transmission of the second ultrasonic signal FM(L)Tx7, second echo data FM(L)Rx7 is acquired. The image generator generates update data for a low frequency echo image of the seventh PING.

When the seventh reception of the second echo signal FM(L)Rx7 ends, an eighth transmission of the first ultrasonic signal FM(H)Tx8 is performed. After the transmission of the first ultrasonic signal FM(H)Tx8, first echo data FM(H)Rx8 is acquired. The image generator generates update data for a high frequency echo image of the eighth PING.

When the eighth reception of the first echo signal FM(H)Rx8 ends, an eighth transmission of the second ultrasonic signal FM(L)Tx8 is performed. After the transmission of the second ultrasonic signal FM(L)Tx8, second echo data FM(L)Rx8 is acquired. The image generator generates update data for a low frequency echo image of the eighth PING.

When the eighth reception of the second echo signal FM(L)Rx8 ends, a second transmission of the fourth ultrasonic signal CW(L)Tx2 is performed. After the transmission of the fourth ultrasonic signal CW(L)Tx2, fourth echo data CW(L)Rx2 is acquired. The fourth echo data CW(H)Rx2 is stored in the additional information generator. The additional information generator pairs up the fourth echo data CW(L) Rx2 obtained from the current transception group with third echo data CW(L)Rx2 obtained from the immediate previous transception group to use them as third water bottom sediment type discrimination data.

Thereafter, similar processing is repeated. By using such a configuration and processing, the feed speed of the echo image can further be speeded up.

Fourth Embodiment

Figure 8:
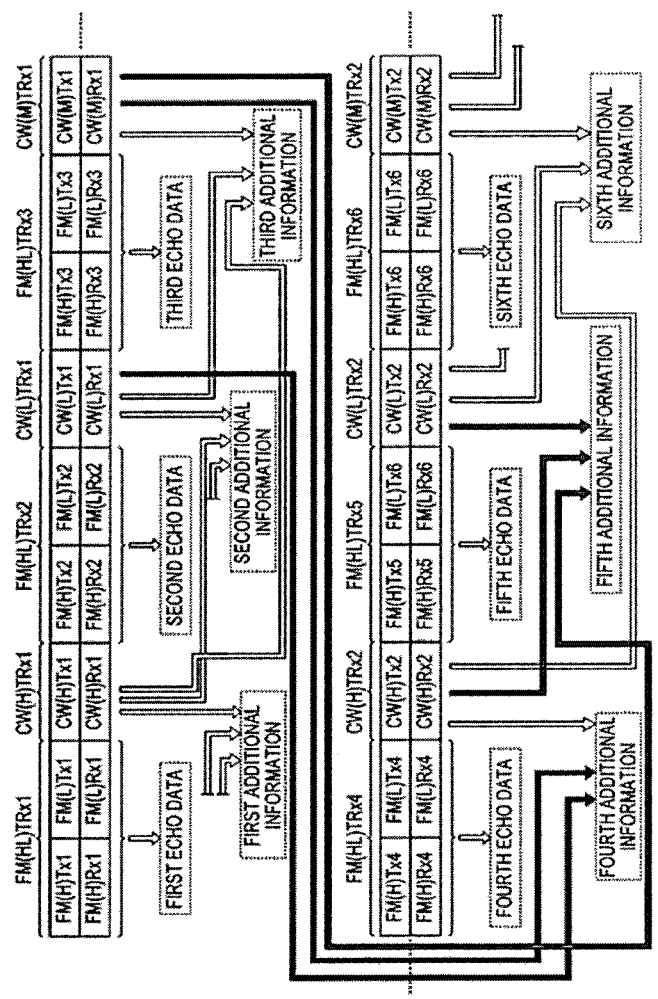
FIG. 8 is a view showing a transception concept of the ultrasonic wave transceiving device according to a fourth embodiment of the invention.

Next, a device and method for transceiving ultrasonic waves according to a fourth embodiment of the invention are described with reference to the appended drawings. FIG. 8 is a view showing a transception concept of an ultrasonic wave transceiving device according to the fourth embodiment. Note that, in FIG. 8, a certain timing during repeated transception is set to be the start of a first transception, and only a predetermined period from the first transception is illustrated. Moreover, hereinafter, the processing in the predetermined period from the first transception is described with reference to FIG. 8.

In the ultrasonic wave transceiving device of this embodiment, a transmission of a fifth ultrasonic signal CW(M)Tx in addition to the transmission of the third and fourth ultrasonic signals CW(H)Tx and CW(L)Tx, and an acquisition of fifth echo data CW(M)Rx by the transmission of the fifth ultrasonic signal CW(M)Tx are performed. The basic configuration of the ultrasonic wave transceiving device of this embodiment is similar to the first embodiment shown in FIG. 1, but the processing is different therefrom. Specifically, the following processing is performed.

At a first transmission timing of a first ultrasonic signal FM(H)Tx1, the first transmission of the first ultrasonic signal FM(H)Tx1 is performed. After the transmission of the first ultrasonic signal FM(H)Tx1, first echo data FM(H)Rx1 is acquired. The image generator of this embodiment generates update data for a high frequency echo image of the first PING.

When the first reception of the first echo signal FM(H)Rx1 ends, a first transmission of the second ultrasonic signal FM(L)Tx1 is performed. After the transmission of the second ultrasonic signal FM(L)Tx1, second echo data FM(L)Rx1 is acquired. The image generator generates update data for a low frequency echo image of the first PING.

When the first reception of the second echo signal FM(L) Rx1 ends, a first transmission of the third ultrasonic signal CW(H)Tx1 is performed. After the transmission of the third ultrasonic signal CW(H)Tx1, third echo data CW(H)Rx1 is acquired. The third echo data CW(H)Rx1 is stored in the additional information generator of this embodiment. The additional information generator pairs up the third echo data CW(H)Rx1 obtained from the current transception group with fourth and fifth echo data CW(L)Rx and CW(M)Rx obtained from the immediate previous transception group and a transception group of one before the immediate previous transception group (not illustrated) to use them as first water bottom sediment type discrimination data (not illustrated).

When the first reception of the third echo signal CW(H) Rx1 ends, a second transmission of the first ultrasonic signal FM(H)Tx2 is performed. After the transmission of the first ultrasonic signal FM(H)Tx2, first echo data FM(H)Rx2 is acquired. The image generator generates update data for a high frequency echo image of the second PING.

When the second reception of the first echo signal FM(H) Rx2 ends, a second transmission of the second ultrasonic signal FM(L)Tx2 is performed. After the transmission of the second ultrasonic signal FM(L)Tx2, second echo data FM(L) Rx2 is acquired. The image generator generates update data for a low frequency echo image of the second PING.

When the second reception of the second echo signal FM(L)Rx2 ends, a first transmission of the fourth ultrasonic signal CW(L)Tx1 is performed. After the transmission of the fourth ultrasonic signal CW(L)Tx1, fourth echo data CW(L) Rx1 is acquired. The fourth echo data CW(L)Rx1 is stored in the additional information generator. The additional information generator pairs up the fourth echo data CW(L)Rx1 obtained from the current transception group with third and fifth echo data CW(H)Rx1 and CW(M)Rx obtained from the immediate previous transception group and a transception group of one before the immediate previous transception group to use them as second water bottom sediment type discrimination data.

When the first reception of the fourth echo signal CW(L) Rx1 ends, a third transmission of the first ultrasonic signal FM(H)Tx3 is performed. After the transmission of the first ultrasonic signal FM(H)Tx3, first echo data FM(H)Rx3 is acquired. The image generator generates update data for a high frequency echo image of the third PING.

When the third reception of the first echo signal FM(H)Rx3 ends, a third transmission of the second ultrasonic signal FM(L)Tx3 is performed. After the transmission of the second ultrasonic signal FM(L)Tx3, second echo data FM(L)Rx3 is acquired. The image generator generates update data for a low frequency echo image of the third PING.

When the third reception of the second echo signal FM(L) Rx3 ends, a first transmission of the fifth ultrasonic signal CW(M)Tx1 is performed. After the transmission of the fifth ultrasonic signal CW(M)Tx1, fifth echo data CW(M)Rx1 is acquired. The fifth echo data CW(M)Rx1 is stored in the additional information generator. The additional information generator pairs up the fifth echo data CW(M)Rx1 obtained from the current transception group with third and fourth echo data CW(H)Rx1 and CW(L)Rx1 obtained from the immediate previous transception group and the transception group of one before the immediate previous transception group to use them as third water bottom sediment type discrimination data.

When the first reception of the fifth echo signal CW(M) Rx1 ends, a fourth transmission of the first ultrasonic signal FM(H)Tx4 is performed. After the transmission of the first ultrasonic signal FM(H)Tx4, first echo data FM(H)Rx4 is acquired. The image generator generates update data for a high frequency echo image of the fourth PING.

When the fourth reception of the first echo signal FM(H) Rx4 ends, a fourth transmission of the second ultrasonic signal FM(L)Tx4 is performed. After the transmission of the second ultrasonic signal FM(L)Tx4, second echo data FM(L) Rx4 is acquired. The image generator generates update data for a low frequency echo image of the fourth PING.

When the fourth reception of the second echo signal FM(L) Rx4 ends, a second transmission of the third ultrasonic signal CW(H)Tx2 is performed. After the transmission of the third ultrasonic signal CW(H)Tx2, third echo data CW(H)Rx2 is acquired. The third echo data CW(H)Rx2 is stored in the additional information generator. The additional information generator pairs up the third echo data CW(H)Rx2 obtained from the current transception group with fourth and fifth echo data CW(L)Rx1 and CW(M)Rx1 obtained from the immediate previous transception group and the transception group of one before the immediate previous transception group to use them as fourth water bottom sediment type discrimination data.

When the second reception of the third echo signal CW(H) Rx2 ends, a fifth transmission of the first ultrasonic signal FM(H)Tx5 is performed. After the transmission of the first ultrasonic signal FM(H)Tx5, first echo data FM(H)Rx5 is acquired. The image generator generates update data for a high frequency echo image of the fifth PING.

When the fifth reception of the first echo signal FM(H)Rx5 ends, a fifth transmission of the second ultrasonic signal FM(L)Tx5 is performed. After the transmission of the second ultrasonic signal FM(L)Tx5, second echo data FM(L)Rx5 is acquired. The image generator generates update data for a low frequency echo image of the fifth PING.

When the fifth reception of the second echo signal FM(L) Rx5 ends, a second transmission of the fourth ultrasonic signal CW(L)Tx2 is performed. After the transmission of the fourth ultrasonic signal CW(L)Tx2, fourth echo data CW(L) Rx2 is acquired. The fourth echo data CW(L)Rx2 is stored in the additional information generator. The additional information generator pairs up the fourth echo data CW(L)Rx2 obtained from the current transception group with fifth and third echo data CW(M)Rx1 and CW(H)Rx2 obtained from the immediate previous transception group and the transception group of one before the immediate previous transception group to use them as fifth water bottom sediment type discrimination data.

When the second reception of the fourth echo signal CW(L)Rx2 ends, a sixth transmission of the first ultrasonic signal FM(H)Tx6 is performed. After the transmission of the first ultrasonic signal FM(H)Tx6, first echo data FM(H)Rx6 is acquired. The image generator generates update data for a high frequency echo image of the sixth PING.

When the sixth reception of the first echo signal FM(H) Rx6 ends, a sixth transmission of the second ultrasonic signal FM(L)Tx6 is performed. After the transmission of the second ultrasonic signal FM(L)Tx6, second echo data FM(L)Rx6 is acquired. The image generator generates update data for a low frequency echo image of the sixth PING.

When the sixth reception of the second echo signal FM(L) Rx6 ends, a second transmission of the fifth ultrasonic signal CW(M)Tx2 is performed. After the transmission of the fifth ultrasonic signal CW(M)Tx2, fifth echo data CW(M)Rx2 is acquired. The fifth echo data CW(M)Rx2 is stored in the additional information generator of this embodiment. The additional information generator pairs up the fifth echo data CW(M)Rx2 obtained from the current transception group with third and fourth echo data CW(H)Rx2 and CW(L)Rx2 obtained from the immediate previous transception group and the transception group of one before the immediate previous transception group to use them as sixth water bottom sediment type discrimination data.

Thereafter, similar processing is repeated. By using such a configuration and processing, the feed speed of the echo image can further be speeded up.

By using such a configuration and processing, even when three kinds of echo data for the water bottom sediment type discrimination exist, the water bottom sediment type result with no degradation in its reliability can be obtained without reducing the update speed of the echo image.

Note that, this embodiment (fourth embodiment) may be combined with the processing of the third embodiment. Specifically, the first and second ultrasonic signals FM(H)Tx1 and FM(L)Tx1 in the first transmission group and the first and second ultrasonic signals FM(H)Tx2 and FM(L)Tx2 in the second transmission group are transmitted sequentially, and then the third ultrasonic signal CW(H)Tx1 is transmitted.

After the transmission of the third ultrasonic signal CW(H) Tx1, the first and second ultrasonic signals FM(H)Tx3 and FM(L)Tx3 in the third transmission group and the first and second ultrasonic signals FM(H)Tx4 and FM(L)Tx4 in the fourth transmission group are transmitted sequentially, and then the fourth ultrasonic signal CW(L)Tx1 is transmitted.

After the transmission of the fourth ultrasonic signal CW(L)Tx1, the first and second ultrasonic signals FM(H)Tx5 and FM(L)Tx5 in the fifth transmission group and the first and second ultrasonic signals FM(H)Tx6 and FM(L)Tx6 in the sixth transmission group are transmitted sequentially, and then the fifth ultrasonic signal CW(M)Tx1 is transmitted.

Thereafter, the similar processing is repeated. By using such a configuration and processing, the similar operations and effects to the above embodiments can be obtained.

Fifth Embodiment

Figure 9:
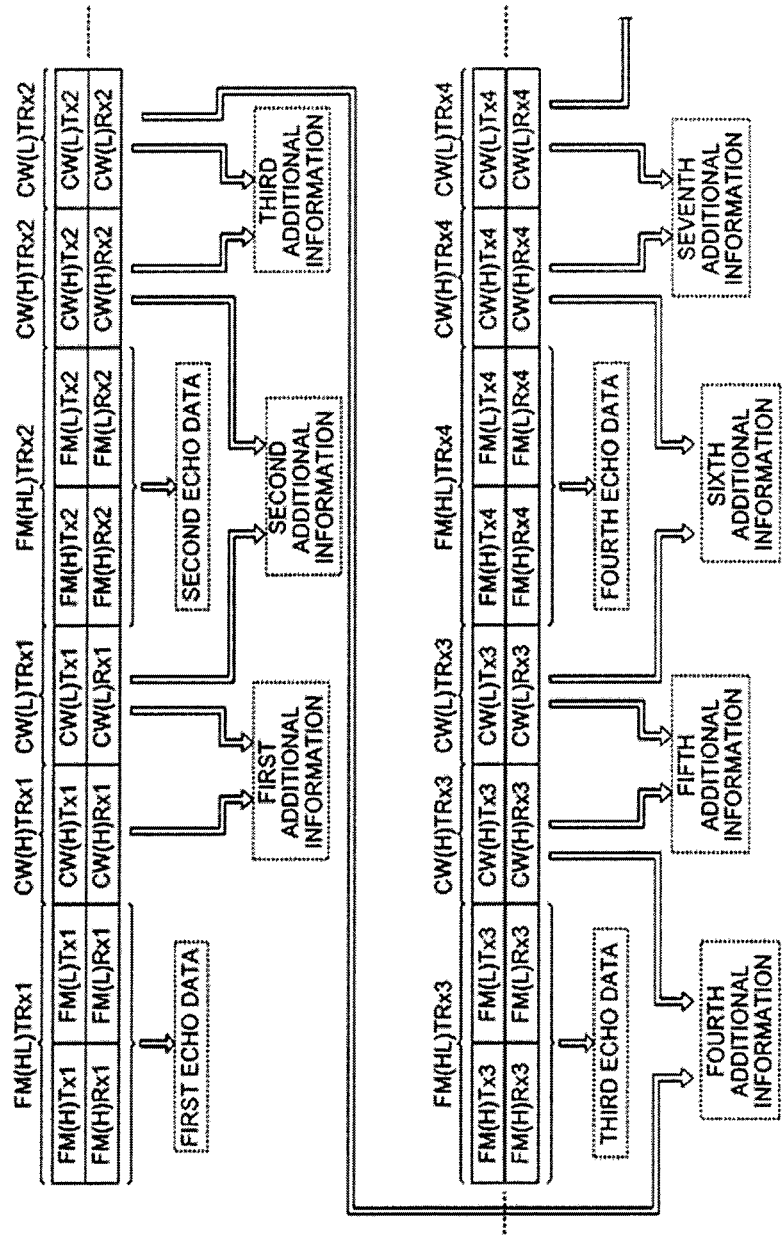
FIG. 9 is a view showing a transception concept of the ultrasonic wave transceiving device according to a fifth embodiment of the invention.
Figure 10:
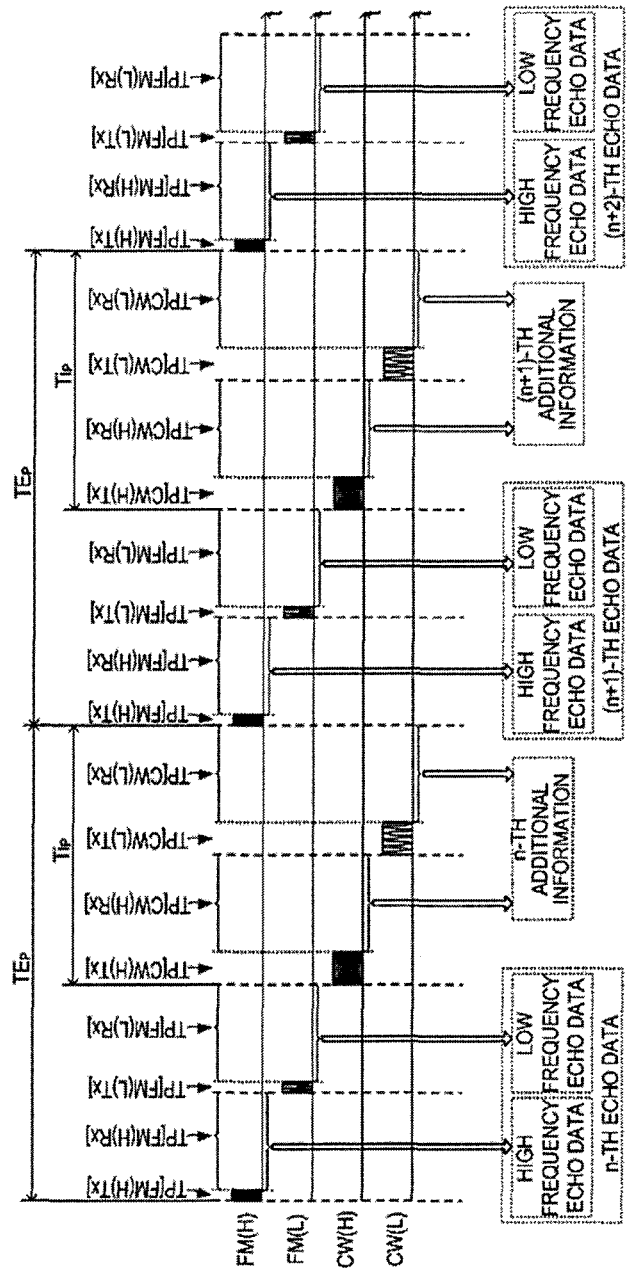
FIG. 10 shows a conventional transception concept.

Next, a device and method for transceiving ultrasonic waves according to a fifth embodiment of the invention are described with reference to the appended drawings. FIG. 9 is a view showing a transception concept of an ultrasonic wave transceiving device according to the fifth embodiment. Note that, in FIG. 9, a certain timing during repeated transception is set to be the start of a first transception, and only a predetermined period from the first transception is illustrated. Moreover, hereinafter, the processing in the predetermined period from the first transception is described with reference to FIG. 9. The basic configuration of the ultrasonic wave transceiving device of this embodiment is similar to the first embodiment shown in FIG. 1, but the processing is different therefrom. Specifically, the following processing is performed.

At a first transmission timing of a first ultrasonic signal FM(H)Tx1, a first transmission of the first ultrasonic signal FM(H)Tx1 is performed. After the transmission of the first ultrasonic signal FM(H)Tx1, first echo data FM(H)Rx1 is acquired. The image generator of this embodiment generates update data for a high frequency echo image of the first PING.

When the first reception of the first echo signal FM(H)Rx1 ends, a first transmission of the second ultrasonic signal FM(L)Tx1 is performed. After the transmission of the second ultrasonic signal FM(L)Tx1, second echo data FM(L)Rx1 is acquired. The image generator generates update data for a low frequency echo image of the first PING.

When the first reception of the second echo signal FM(L) Rx1 ends, a first transmission of the third ultrasonic signal CW(H)Tx1 is performed. After the transmission of the third ultrasonic signal CW(H)Tx1, third echo data CW(H)Rx1 is acquired. The third echo data CW(H)Rx1 is stored in the additional information generator of this embodiment. The additional information generator pairs up the third echo data CW(H)Rx1 obtained from the current transception group with fourth echo data CW(L)Rx obtained from the immediate previous transception group (not illustrated) to use them as water bottom sediment type discrimination data.

When the first reception of the third echo signal CW(H) Rx1 ends, a first transmission of the fourth ultrasonic signal CW(L)Tx1 is performed. After the transmission of the fourth ultrasonic signal CW(L)Tx1, fourth echo data CW(L)Rx1 is acquired. The fourth echo data CW(L)Rx1 is stored in the additional information generator of this embodiment. The additional information generator pairs up the fourth echo data CW(L)Rx1 obtained from the current transception group with third echo data CW(L)Rx1 obtained immediately previously thereto to use them as first water bottom sediment type discrimination data.

When the first reception of the fourth echo signal CW(L) Rx1 ends, a second transmission of the first ultrasonic signal FM(H)Tx2 is performed. After the transmission of the first ultrasonic signal FM(H)Tx2, first echo signal FM(H)Rx2 is acquired. The image generator generates update data for a high frequency echo image of the second PING.

When the second reception of the first echo signal FM(H)Rx2 ends, a second transmission of the second ultrasonic signal FM(L)Tx2 is performed. After the transmission of the second ultrasonic signal FM(L)Tx2, second echo data FM(L)Rx2 is acquired. The image generator generates update data for a low frequency echo image of the second PING.

When the second reception of the second echo signal FM(L)Rx2 ends, a second transmission of the third ultrasonic signal CW(H)Tx2 is performed. After the transmission of the third ultrasonic signal CW(H)Tx2, third echo data CW(H)Rx2 is acquired. The third echo data CW(H)Rx2 is stored in the additional information generator. The additional information generator pairs up the third echo data CW(H)Rx2 obtained from the current transception group with fourth echo data CW(L)Rx1 obtained from the immediate previous transception group to use them as second water bottom sediment type discrimination data.

When the second reception of the third echo signal CW(H)Rx2 ends, a second transmission of the fourth ultrasonic signal CW(L)Tx2 is performed. After the transmission of the fourth ultrasonic signal CW(L)Tx2, fourth echo data CW(L)Rx2 is acquired. The fourth echo data CW(L)Rx2 is stored in the additional information generator. The additional information generator pairs up the fourth echo data CW(L)Rx2 obtained from the current transception group with third echo data CW(L)Rx2 obtained immediately previously thereto to use them as third water bottom sediment type discrimination data.

When the second reception of the fourth echo signal CW(L)Rx2 ends, a third transmission of the first ultrasonic signal FM(H)Tx3 is performed. After the transmission of the first ultrasonic signal FM(H)Tx3, first echo data FM(H)Rx3 is acquired. The image generator generates update data for a high frequency echo image of the third PING.

When the third reception of the first echo signal FM(H)Rx3 ends, a third transmission of the second ultrasonic signal FM(L)Tx3 is performed. After the transmission of the second ultrasonic signal FM(L)Tx3, second echo data FM(L)Rx3 is acquired. The image generator generates update data for a low frequency echo image of the third PING.

When the third reception of the second echo signal FM(L)Rx3 ends, a third transmission of the third ultrasonic signal CW(H)Tx3 is performed. After the transmission of the third ultrasonic signal CW(H)Tx3, third echo data CW(H)Rx3 is acquired. The third echo data CW(H)Rx3 is stored in the additional information generator. The additional information generator pairs up the third echo data CW(H)Rx3 obtained from the current transception group with fourth echo data CW(L)Rx2 obtained from the immediate previous transception group to use them as fourth water bottom sediment type discrimination data.

When the third reception of the third echo signal CW(H)Rx3 ends, a third transmission of the fourth ultrasonic signal CW(L)Tx3 is performed. After the transmission of the fourth ultrasonic signal CW(L)Tx3, fourth echo data CW(L)Rx3 is acquired. The fourth echo data CW(L)Rx3 is stored in the additional information generator. The additional information generator pairs up the fourth echo data CW(L)Rx3 obtained from the current transception group with third echo data CW(L)Rx3 obtained immediately previously thereto to use them as fifth water bottom sediment type discrimination data.

When the third reception of the fourth echo signal CW(L)Rx3 ends, a fourth transmission of the first ultrasonic signal FM(H)Tx4 is performed. After the transmission of the first ultrasonic signal FM(H)Tx4, first echo data FM(H)Rx4 is acquired. The image generator generates update data for a high frequency echo image of the fourth PING.

When the fourth reception of the first echo signal FM(H)Rx4 ends, a fourth transmission of the second ultrasonic signal FM(L)Tx4 is performed. After the transmission of the second ultrasonic signal FM(L)Tx4, second echo data FM(L)Rx4 is acquired. The image generator generates update data for a low frequency echo image of the fourth PING.

When the fourth reception of the second echo signal FM(L)Rx4 ends, a fourth transmission of the third ultrasonic signal CW(H)Tx4 is performed. After the transmission of the third ultrasonic signal CW(H)Tx4, third echo data CW(H)Rx4 is acquired. The third echo data CW(H)Rx4 is stored in the additional information generator. The additional information generator pairs up the third echo data CW(H)Rx4 obtained from the current transception group with fourth echo data CW(L)Rx3 obtained from the immediate previous transception group to use them as sixth water bottom sediment type discrimination data.

When the fourth reception of the third echo signal CW(H)Rx4 ends, a fourth transmission of the fourth ultrasonic signal CW(L)Tx4 is performed. After the transmission of the fourth ultrasonic signal CW(L)Tx4, fourth echo data CW(L)Rx4 is acquired. The fourth echo data CW(L)Rx4 is stored in the additional information generator. The additional information generator pairs up the fourth echo data CW(L)Rx4 obtained from the current transception group with third echo data CW(L)Rx4 obtained immediately previously thereto to use them as seventh water bottom sediment type discrimination data.

Thereafter, similar processing is repeated. By using such a configuration and processing, the acquisition frequency of the water bottom sediment type discrimination result can be improved without reducing the update speed of the echo image. Thus, the reliability of the water bottom sediment type discrimination result can be improved.

Note that, this embodiment (fifth embodiment) may be combined with the processing using three kinds of ultrasonic signals for the water bottom sediment type discrimination (the third, fourth and fifth ultrasonic signals CW(H)Tx, CW(L)Tx, and CW(M)Tx) similar to the fourth embodiment.

Note that, in the above description, the examples in which the kinds of the ultrasonic signals for the water bottom sediment type discrimination is either one of two and three is shown; however, it may be other number of kinds (four or more kinds). Moreover, the examples in which the number of the kinds of the ultrasonic signals for the echo image generation is two is shown; however, it may be one, three or more.

Additionally, the transmission order of the ultrasonic signals for the same purpose may be opposite. For example, the transmission order of the first and second ultrasonic signals FM(H)Tx and FM(L)Tx may be opposite. Moreover, the high and low frequency echo images are not necessarily be updated simultaneously, as long as the high frequency echo image is updated when the first echo data FM(H)Rx is obtained, and the low frequency echo image is updated when the second echo data FM(L)Rx is obtained. Furthermore, the generation of the fish body length information and the generations of the high and low frequency echo images may be performed in the opposite order. Similarly, the transmission order of the third, fourth and fifth ultrasonic signals CW(H)Tx, CW(L)Tx, and CW(M)Tx is not limited to the above.

Additionally, in the description of the second embodiment, the case of repeatedly transmitting the first and second ultrasonic signals FM(H)Tx and FM(L)Tx is shown; however, also in the case of repeatedly transmitting the third and fourth ultrasonic signals CW(H)Tx and CW(L)Tx, the configuration and processing of the second embodiment can be applied.

Additionally, in the description of the first embodiment, the example is shown in which either one of the third and fourth ultrasonic signals CW(H)Tx and CW(L)Tx is transmitted between the transmissions of two pairs of first and second ultrasonic signals FM(H)Tx and FM(L)Tx adjacent to each other in the time axis. However, when the update cycle of the additional information (e.g., the water bottom sediment type discrimination) is prioritized, it may be such that the third and fourth ultrasonic signals CW(H)Tx and CW(L)Tx are paired up, either one of the first and second ultrasonic signals FM(H)Tx and FM(L)Tx is transmitted between the transmissions of two pairs of third and fourth ultrasonic signals CW(H)Tx and CW(L)Tx adjacent to each other in the time axis. This is also applicable to the other embodiments.

Moreover, the generating method of the fish body length information of the second embodiment may be applied to the two pairs of the echo signals FM(H)Rx and FM(L)Rx of first and second ultrasonic signals FM(H)Tx and FM(L)Tx adjacent to each other in the time axis. Thus, a plurality of additional information (water bottom sediment type discrimination information and fish body length information) can be obtained while speeding up the update speed of the echo image.

Furthermore, in the above description, the third and fourth ultrasonic signals CW(H)Tx and CW(L)Tx are only different in the carrier wave frequency; however, the pulse length may be different therebetween. Thus, more accurate water bottom sediment type discrimination can be performed. Similarly, the carrier wave frequency and the pulse length may be different among the third, fourth and fifth ultrasonic signals CW(H)Tx, CW(L)Tx, and CW(M)Tx.

Additionally, in the above description, the example of sequentially transmitting the respective ultrasonic signals is shown; however, by providing a configuration that can simultaneously transmit ultrasonic signals of two kinds of frequencies, the two kinds of ultrasonic signals adjacent to each other in the time axis may be transmitted simultaneously. For example, in the example of the first embodiment, the first and second ultrasonic signals FM(H)Tx and FM(L)Tx are transmitted simultaneously, and then the third and first ultrasonic signals CW(H)Tx and FM(H)Tx are transmitted simultaneously. Next, the second and fourth ultrasonic signals FM(L)Tx and CW(L)Tx are transmitted simultaneously.

Moreover, in the above description, the example is shown in which the water bottom sediment type discrimination and the fish body length determination are performed as the purpose of generating the additional information on top of the echo image; however, the generation of the additional information on top of the echo image can be applied to when performing a fish kind discrimination, etc.

Furthermore, in the above description, the example of using the frequency-modulated ultrasonic signal as the ultrasonic signal for the echo image generation is shown; however, a frequency-unmodulated signal may be used.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An ultrasonic wave transceiving device, comprising:
a transmitter configured to transmit at least one kind of first detection data ultrasonic signal and first and second kinds of second detection data ultrasonic signal, such that during a first transmission period the transmitter transmits the at least one kind of first detection data ultrasonic signal and the first kind of second detection data ultrasonic signal without transmitting the second kind of second detection data ultrasonic signal, and during a second transmission period, which is adjacent to the first transmission period in a time axis, the transmitter transmits the at least one kind of first detection data ultrasonic signal and the second kind of second detection data ultrasonic signal without transmitting the first kind of second detection data ultrasonic signal so that the at least one kind of first detection data ultrasonic signal in the second transmission period is between the first kind of second detection data ultrasonic signal in the first transmission period and the second kind of the second detection data ultrasonic signal in the second transmission period along the time axis;
a receiver configured to receive echo signals of the first and second detection data ultrasonic signals;
a first information generator configured to generate first information based on an echo signal of the first detection data ultrasonic signal; and
a second information generator configured to generate second information, relating to the first information, based on echo signals of the first and second kinds of the second detection data ultrasonic signal transmitted during the first transmission period and the second transmission period, respectively.

2. The device of claim 1, wherein the first information is generated as an echo image, and the second information is generated as information indicating a property of a target object appearing in the echo image.

3. The device of claim 2, wherein the transmitter transmits underwater each ultrasonic signal, wherein
the echo image includes images of a school-of-fish, a single fish, and a water bottom underwater; and
the second information is information indicating a sediment type of the water bottom.

4. The device of claim 1, wherein
the first detection data ultrasonic signal includes a plurality of ultrasonic signals that are transmitted individually; and
the second information generator generates third information by using echo signals of the plurality of ultrasonic signals forming the first detection data ultrasonic signal, the ultrasonic signals being adjacent to each other in the time axis.

5. An ultrasonic wave transceiving device, comprising:
a transmitter configured to transmit a plurality of first detection data ultrasonic signals as one group;
a receiver configured to receive echo signals of the first detection data ultrasonic signals;
an information generator configured to generate first information pertaining to an object based on each of the echo signals of the group of the first detection data ultrasonic signals; and an additional information generator configured to generate additional information pertaining to characteristics of the object by using echo signals of the first detection data ultrasonic signals that are adjacent to each other in a time axis.

6. The device of claim 5, wherein the object is a single fish and the additional information is information indicating a fish body length of the single fish.

7. The device of claim 1, wherein
the first detection data ultrasonic signal includes first and second ultrasonic signals having a first pulse length;
the second detection data ultrasonic signal includes third and fourth ultrasonic signals having a second pulse length;
the first information is generated based on the echo signals of the first and second ultrasonic signals; and
the second information is generated based on the echo signals of the third and fourth ultrasonic signals.

8. The device of claim 7, wherein the first pulse length is different from the second pulse length.

9. A method of transceiving ultrasonic waves, comprising:
transmitting at least one kind of first detection data ultrasonic signal and first and second kinds of second detection data ultrasonic signal, such that during a first transmission period the transmitter transmits the at least one kind of first detection data ultrasonic signal and the first kind of second detection data ultrasonic signal without transmitting the second kind of second detection data ultrasonic signal, and during a second transmission period, which is adjacent to the first transmission period in a time axis, the transmitter transmits the at least one kind of first detection data ultrasonic signal and the second kind of second detection data ultrasonic signal without transmitting the first kind of second detection data ultrasonic signal so that the at least one kind of first detection data ultrasonic signal in the second transmission period is between the first kind of second detection data ultrasonic signal in the first transmission period and the second kind of the second detection data ultrasonic signal in the second transmission period along the time axis;
receiving echo signals of the first and second detection data ultrasonic signals;
generating first information based on an echo signal of the first detection data ultrasonic signal; and
generating second information, relating to the first information, based on echo signals of the first and second kinds of the second detection data ultrasonic signal transmitted during the first transmission period and the second transmission period, respectively.

10. The device of claim 9, wherein each ultrasonic signal is transmitted underwater, wherein
the first information is an echo image including a school-of-fish, a single fish, and a water bottom underwater; and
the second information is information indicating a sediment type of the water bottom.

* * * * *